(12) United States Patent
Cardoso-Menezes et al.

(10) Patent No.: US 10,816,477 B2
(45) Date of Patent: Oct. 27, 2020

(54) INFRARED AND FLUORESCENCE SPECTROSCOPIC FINGER-PRINTING OF RAW MATERIALS FOR USE IN THE CULTIVATION OF A MAMMALIAN CELL EXPRESSING A PROTEIN OF INTEREST

(71) Applicant: Hoffmann-La Roche Inc., Little Falls, NJ (US)

(72) Inventors: Jose Cardoso-Menezes, Lisbon (PT); Christian Hakemeyer, Munich (DE); Gledson Emidio Jose, Glasgow-Scotland (GB); Ulrike Strauss, Kochel am See (DE); Silke Werz, Munich (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 230 days.

(21) Appl. No.: 15/712,378

(22) Filed: Sep. 22, 2017

(65) Prior Publication Data

US 2018/0202938 A1    Jul. 19, 2018

Related U.S. Application Data

(63) Continuation of application No. 13/886,869, filed on May 3, 2013, now abandoned, which is a continuation of application No. PCT/EP2011/069267, filed on Nov. 3, 2011.

(30) Foreign Application Priority Data

Nov. 5, 2010  (EP) .................................. 10190193

(51) Int. Cl.
*G01N 21/78*    (2006.01)
*G01N 21/64*    (2006.01)
*G01N 21/3577*  (2014.01)
*G01N 24/08*    (2006.01)
*G01N 21/359*   (2014.01)

(52) U.S. Cl.
CPC .......... *G01N 21/78* (2013.01); *G01N 21/3577* (2013.01); *G01N 21/6486* (2013.01); *G01N 24/087* (2013.01); *G01N 21/359* (2013.01); *G01N 2021/6423* (2013.01); *G01N 2201/1293* (2013.01)

(58) Field of Classification Search
None
See application file for complete search history.

(56) References Cited

U.S. PATENT DOCUMENTS

| 5,498,875 A | 3/1996 | Obremski et al. |
| 2008/0177481 A1 | 7/2008 | Popp et al. |
| 2009/0306932 A1 | 12/2009 | Li et al. |
| 2010/0129857 A1 | 5/2010 | Walsh et al. |

FOREIGN PATENT DOCUMENTS

| CN | 01846617 A | 9/2010 |
| EP | 2128599 | 12/2009 |
| JP | 09-507579 | 7/1997 |
| WO | 9605500 | 2/1996 |
| WO | 2010/62351 | 6/2010 |

OTHER PUBLICATIONS

International Search Report of PCT/EP2011/069267 (WO 2012/059520), pp. 1-5 ( dated May 10, 2012).
Notice of Reasons for Rejection issued in the corresponding Japanese Patent Application No. 2013-537127, pp. 1-2, with English translation in 2 pages. (dated Mar. 19, 2014).

*Primary Examiner* — G Steven Vanni
(74) *Attorney, Agent, or Firm* — Daphne Reddy

(57) ABSTRACT

The invention provides a method for the selection of cultivation component batches to be used in the cultivation of a mammalian cell expressing a protein of interest wherein at least two different components are employed in the cultivation.

7 Claims, 21 Drawing Sheets

INFRARED AND FLUORESCENCE SPECTROSCOPIC FINGER-PRINTING OF RAW MATERIALS FOR USE IN THE CULTIVATION OF A MAMMALIAN CELL EXPRESSING A PROTEIN OF INTEREST

CROSS REFERENCE TO RELATED APPLICATIONS

This application is a continuation of U.S. patent application Ser. No. 13/886,869, filed May 3, 2013, which is a continuation of International Application No. PCT/EP2011/069267 having an international filing date of Nov. 3, 2011, the entire contents of each of which are incorporated herein by reference, and which claims benefit under 35 U.S.C. § 119 to European Patent Application No. 10190193.2 filed Nov. 5, 2010.

TECHNICAL FIELD

Herein is reported a method for the evaluation of cultivation material components with respect to product yield already upon receipt thereof and prior to and without the need to perform a test cultivation.

BACKGROUND OF THE INVENTION

The market for recombinant biopharmaceutical products has been growing constantly since the early 1980s, when recombinant DNA technology made it possible to express recombinant proteins in different types of microorganisms like bacteria, yeast or mammalian cells. Since then, these protein products have been used in a wide array of diagnostic and pharmaceutical applications.

As the demand for recombinant proteins rises, the need for highly effective and robust production processes is imminent. One of the most important influencing factors for robust and reproducible production processes is the composition of the starting materials, such as culture media. Most culture media are complex mixtures of among other things inorganic salts, sugars, amino acid, vitamins, organic acids and buffers. In many cases, complex, not chemically defined raw materials like protein hydrolyzates of plant or bacterial origin are used to promote cell growth and protein production.

Commonly, raw materials are supplied as powder mixtures and then dissolved in water to form the cultivation medium. In many cases, for not chemically defined protein hydrolyzates and also for chemically defined basal media mixtures, a significant lot-to-lot variability can be observed, leading to large variations in the yield of recombinantly produced therapeutic proteins.

Rapid spectroscopic 'finger-printing' techniques like Near-, Mid-Infrared, Raman, or 2D-Fluorescence spectroscopies, are relatively inexpensive and are well suited to analyze complex mixtures. These methods generate very large amounts of high dimensional data that can only be handled by chemometric methods like principal component analysis (PCA) or partial least squares (PLS) modeling. The combination of complex spectroscopic methods and chemometrics is commonly used in identity testing for raw materials or as a tool for the classification of raw materials.

The use of principal component analysis (PCA) and partial least squares (PLS) for processing and modeling complex data have been reported by Næs, T., et al., (Næs, T., et al., NIR Publications, (2002)). In WO 2009/086083 a method for hierarchically organizing data using PLS is reported. An analyzer and method for determining the relative importance of fractions of biological mixtures is reported in WO 2008/146059. In WO 2009/061326 the evaluation of chromatographic materials is reported. In US 2009/0306932 a rapid classification method for multivariate data arrays is reported. Analyzing spectral data for the selection of a calibration model is reported in EP 2 128 599. In U.S. Pat. No. 5,498,875 a signal processing for chemical analysis of samples is reported. A method for classifying scientific materials such as silicate materials, polymer materials and/or nanomaterials is reported in US 2008/0177481. In US 2010/0129857 methods for the isolation and identification of microorganisms are reported.

SUMMARY OF THE INVENTION

It has been found that the performance of production processes for recombinant proteins can be predicted based on the combination of NIR and 2D-fluorescence spectra of media components, such as protein hydrolysates and/or chemically defined media preparations which are used as components of a complex cultivation medium.

One aspect as reported herein is a method for the selection of cultivation media component batches or lots to be used in the cultivation of a mammalian cell expressing a protein of interest wherein at least two different components are employed in the cultivation, using for such selection fused spectral data of two different spectroscopic techniques.

In one embodiment the method for the selection of cultivation component lots to be used in the cultivation of a mammalian cell expressing a protein of interest wherein at least two different cultivation components are employed in the cultivation comprises the following steps:
  a) providing spectra of different lots of a first component obtained with a first spectroscopic method, spectra of different lots of a second component obtained with a second spectroscopic method that is different from the first spectroscopic method, and the cultivation supernatant yield of the protein of interest obtained in a cultivation using combinations of these different lots of the first and the second component,
  b) identifying a relation of fused spectra after computing spectra PCA scores with the yield of the cultivation,
  c) providing a spectrum of a further lot of the first component obtained with the first spectroscopic method and/or a spectrum of a further lot of the second component obtained with the second spectroscopic method, and
  d) selecting the combination of the provided first component and the provided second component if the predicted cultivation supernatant yield based on the relation of fused spectra after computing spectra PCA scores identified in b) is within +/−10% of the mean yield provided in a).

In one embodiment the method for the selection of cultivation component lots to be used in the cultivation of a mammalian cell expressing a protein of interest wherein at least two different cultivation components are employed in the cultivation comprises the following steps:
  a) providing spectra of different lots of a first component obtained with a first spectroscopic method, spectra of different lots of a second component obtained with a second spectroscopic method that is different from the first spectroscopic method, and the cultivation supernatant yield of the protein of interest obtained in a cultivation using combinations of these different lots of the first and the second component, b) processing the spectra, filtering the spectra, smoothing the spectra, and transforming the spectra to their first derivative,
c) identifying patterns in the spectra,
d) identifying a relation of the patterns identified in c) with the yield of the cultivation,
e) providing a spectrum of a further lot of the first component obtained with the first spectroscopic method and/or a spectrum of a further lot of the second component obtained with the second spectroscopic method,
f) processing the spectra, filtering the spectra, smoothing the spectra, and transforming the spectra to their first derivative,
g) selecting the combination of the provided first component and the provided second component if the predicted cultivation supernatant yield based on the relation identified in d) is within +/−10% of the mean yield provided in a).

In one embodiment the first and second spectroscopic method are selected from NIR spectroscopy, MIR spectroscopy, and 2D-fluorescence spectroscopy.

In one embodiment the processing of the spectra comprises the removing of the water absorption regions and the applying of a multiplicative scatter correction, and/or the filtering comprises a Savitzky-Golay filtering.

In one embodiment the identifying patterns in the spectra is by principal component analysis. In one embodiment the principal component analysis is an unfolded principal component analysis. In one embodiment the unfolding preserves the information of the first mode (sample). In one embodiment the Savitzky-Golay smoothing is with a window of 19 points and a $2^{nd}$ order polynomial. In one embodiment the data is mean-centered, and the optimal number of principal components is chosen using the leave-one-out cross validation method.

In one embodiment the processing comprises the exclusion of the regions of scattering and the interpolation of the removed points. In one embodiment the final spectra are made up by the emission wavelength range of 290 nm to 594 nm and the excitation wavelength range of 230 nm to 575 nm.

In one embodiment the identifying of a relation between spectra fused and compressed with PCA scores, with cultivation yield at harvest is by partial least square analysis.

In one embodiment the NIR spectra are collected over the wavenumber region of 4,784 $cm^{-1}$ to 8,936 $cm^{-1}$.

In one embodiment the spectral dimensionality is reduced from 1,039 wavenumbers to 3 principal components.

In one embodiment the protein of interest is an antibody, or an antibody fragment, or an antibody conjugate.

DETAILED DESCRIPTION OF THE INVENTION

Figure 1:
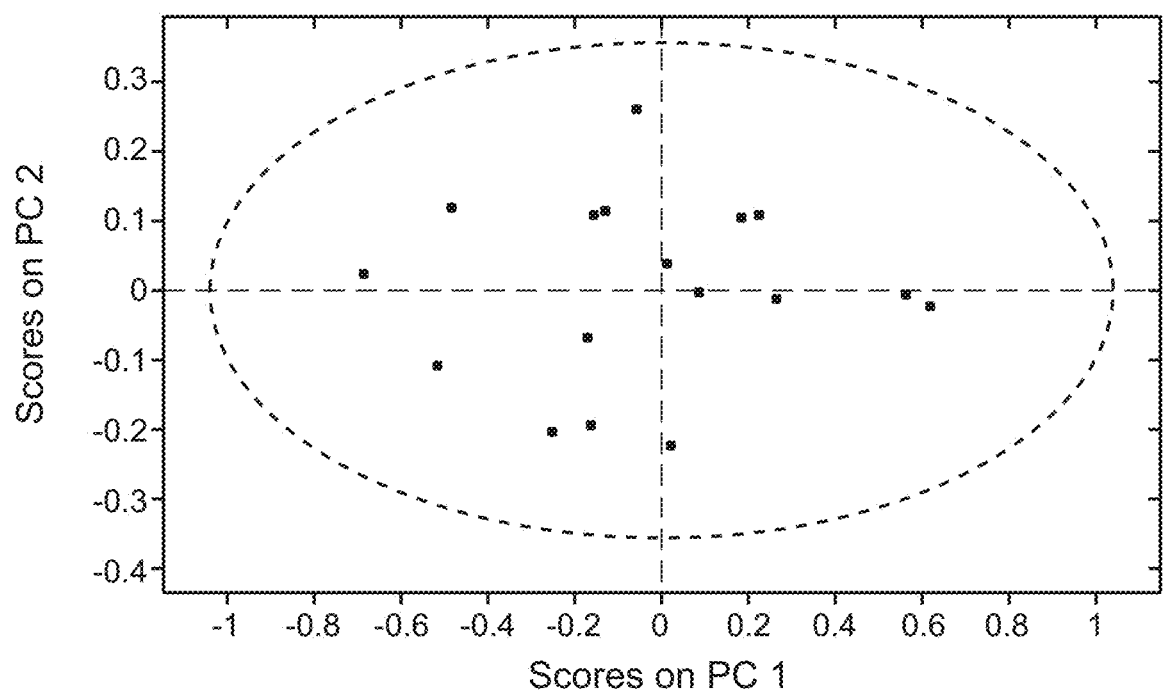
FIG. 1 Distribution of the different tested soy protein hydrolyzate lots on a 2-dimensional space built through PCA based on the original NIR spectra.

It has been found that the performance of production processes for recombinant proteins can be predicted based on the combined information contained in NIR and 2D-fluorescence spectra of media components, such as protein hydrolyzates and/or chemically defined media preparations which are used as components of a complex cultivation medium.

Herein is reported a method in which spectra from two different (orthogonal) spectroscopy techniques—after processing to make them additive via variable reduction to principal component analysis (PCA) scores—obtained on two media components used in the fermentation of recombinant biopharmaceuticals are combined and models of such transformed spectra (inputs) are used to predict the yields at harvest (output) of biopharmaceutical product's cultivations based on mixtures of studied media components with lot-to-lot variability in terms of different fermentation performance.

By using different (orthogonal) spectroscopies in combination with PCA methods (to ensure their additivity) and producing process models of the effect of such cultivation media mixtures on yields at harvest of the main fermentation a predictive capability is established that allows selecting media lots of each raw material and/or formulating mixtures that best serve the process goals.

Different lots of individual components forming a complete cultivation medium vary slightly in their detailed composition but are still within the specification given by the manufacturer. In some cases, it is possible to trace this variability to single ingredients, but most commonly the lot-to-lot variability cannot be detected by analytical means. For the evaluation of the influence of different individual component lots on product yield a comparable cultivation of the same mammalian cell line can be repeatedly performed.

Herein are reported 56 cultivations in which nine different lots of a soy protein hydrolyzate, two mixtures of two different soy protein hydrolyzate lots, five lots of a rice protein hydrolyzate, and six lots of a chemically defined basic medium powder were employed in the fermentation and feed medium, respectively.

To assess the influence of different soy protein hydrolyzate lots with respect to product yield comparable cultivations were performed in which the same lots of a chemically defined basic medium and a rice protein hydrolyzate were used in fermentation and feed media. The results can be grouped according to the different soy protein hydrolyzate lots employed. The performance of different lots was evaluated based on the product yield at similar average inoculation cell density (ICD) values (Table 1).

TABLE 1

| batch | soy protein hydrolyzate lot No. | chemically defined basic medium lot No. | rice protein hydrolyzate lot No. | ICD | product at 330 h [mg/l] |
|---|---|---|---|---|---|
| D45KD11 | 1 | 1 | 1 | 5.7 | 1319 |
| D45KD12 | | | | 5.3 | 1234 |
| D45KD13 | | | | 5.6 | 1305 |
| D45KD22 | 2 | | | 5.3 | 1023 |
| D45KD23 | | | | 5.1 | 1070 |
| D45KD31 | 3 | | | 4.8 | 1008 |
| D45KD32 | | | | 4.9 | 991 |
| D45KD33 | | | | 5.3 | 978 |

The results obtained for a second set of cultivations are listed in Table 2.

TABLE 2

| batch | soy protein hydrolyzate lot No. | chemically defined basic medium lot No. | rice protein hydrolyzate lot No. | ICD | product at 330 h [mg/l] |
|---|---|---|---|---|---|
| D52KD11 | 1 | 2 | 2 | 6.1 | 1434 |
| D52KD12 | | | | 5.0 | 1411 |
| D52KD13 | | | | 5.6 | 1459 |
| D52KD21 | 4 | | | 5.0 | 1213 |
| D52KD22 | | | | 5.3 | 1243 |
| D52KD23 | | | | 5.4 | 1163 |
| D55KD11 | 5 | | | 5.0 | 1409 |
| D55KD12 | | | | 5.4 | 1426 |
| D55KD13 | | | | 5.7 | 1430 |
| D55KD21 | 2 | | | 6.8 | 1263 |
| D55KD22 | | | | 6.8 | 1256 |
| D55KD23 | | | | 6.8 | 1278 |
| D55KD31 | 6 | | | 6.1 | 1269 |
| D55KD32 | | | | 6.1 | 1262 |
| D55KD33 | | | | 5.8 | 1265 |

It can be seen that different lots of the individual components result in different product yields. In this series of cultivations also different average ICD values were used. Although having low ICD values, cultivations using lot 1 and lot 5 gave significantly higher product yields than the ones having higher ICD values (lot 3 and lot 6). Thus, different soy protein hydrolyzate lots results in different production performance.

Analogously the influence of rice protein hydrolyzate on process performance can be evaluated (Table 3).

TABLE 3

| batch | soy protein hydrolyzate lot No. | chemically defined basic medium lot No. | rice protein hydrolyzate lot No. | ICD | product at 330 h [mg/l] |
|---|---|---|---|---|---|
| D61KD11 | 3 | 3 | 2 | 5.9 | 1132 |
| D61KD12 | | | | 6.0 | 1085 |
| D61KD13 | | | | 5.3 | 1101 |
| D61KD21 | | | 3 | 6.1 | 1062 |
| D61KD22 | | | | 6.1 | 1056 |
| D61KD23 | | | | 5.6 | 1043 |

Six cultivations were performed and can be grouped according to the different lots of rice protein hydrolyzate used in each of them. Performance of the different rice protein hydrolyzate lots can be evaluated based on the mean product yield. Both groups, i.e. rice protein hydrolyzate lots, have similar ICD values.

To assess the influence of the chemically defined basic medium on the product yield, cultivations can be performed with the same lots of soy protein hydrolyzate and rice protein hydrolyzate in the fermentation initial media formulation and feed media. Three series of experiments were performed (Tables 4, 5 and 6).

The first series comprised six cultivations having soy protein hydrolyzate lot 3 (as in Table 3) and rice protein hydrolyzate lot 2 (as in Table 2) in the fermentation and feed media. Cultivations were grouped according to the chemically defined basic medium lot used. Performance of different chemically defined basic medium lots was evaluated based on the product yield. There is a slight difference between the two groups in both the average ICD and average product yield. With lower ICD a lower product formation can be obtained. Thus, the chemically defined basic medium lots have little or no effect on product yield.

TABLE 4

| batch | soy protein hydrolyzate lot No. | chemically defined basic medium lot No. | rice protein hydrolyzate lot No. | ICD | product at 330 h [mg/l] |
|---|---|---|---|---|---|
| D55KD21 | 3 | 2 | 2 | 6.8 | 1263 |
| D55KD22 | | | | 6.8 | 1256 |
| D55KD23 | | | | 6.8 | 1278 |
| D61KD11 | | 3 | | 5.9 | 1132 |
| D61KD12 | | | | 6.0 | 1085 |
| D61KD13 | | | | 5.3 | 1101 |

The second series involved six cultivations employing soy protein hydrolyzate lot 1 (as in Table 2) in the fermentation initial media formulation and feed media. Experiments were grouped according to the chemically defined basic medium lot used. No significant ICD differences were present. Thus, the differences on product yield are due to differences in the chemically defined basic medium lots used.

TABLE 5

| batch | soy protein hydrolyzate lot No. | chemically defined basic medium lot No. | ICD | product at 330 h [mg/l] |
|---|---|---|---|---|
| D45KD11 | 1 | 1 | 5.7 | 1319 |
| D45KD12 | | | 5.3 | 1234 |
| D45KD13 | | | 5.6 | 1205 |
| D52KD11 | | 2 | 6.1 | 1434 |
| D52KD12 | | | 5.0 | 1411 |
| D52KD13 | | | 5.6 | 1459 |

The third series involved five cultivations having soy protein hydrolyzate lot 2 in the fermentation initial media formulation and feed media. Experiments were grouped according to the chemically defined basic medium lot used. There is a difference between the two groups in both the ICD used and the product concentration obtained.

TABLE 6

| batch | soy protein hydrolyzate lot No. | chemically defined basic medium lot No. | ICD | product at 330 h [mg/l] |
|---|---|---|---|---|
| D45KD22 | 2 | 1 | 5.3 | 1023 |
| D45KD23 | | | 5.1 | 1070 |
| D73KD11 | | 4 | 4.9 | 1062 |
| D73KD12 | | | 4.3 | 1112 |
| D73KD13 | | | 4.4 | 1121 |

From the above it can be seen that there exists a need for raw-material lot characterization and a need to provide a method in which the obtained data can be used to predict which raw-material lots produce higher yields of product without the need to perform fermentation experiments.

NIR, MIR, and 2D-fluorescence spectra can be acquired of all lots of the three different cultivation media components. Thereafter spectra analysis can be performed with established chemometric methods. A novel way of analyzing the spectral information obtained with these different sources is reported herein and can be used for predictive modeling purposes.

NIR spectra of the lots of the raw materials were obtained as triplicates in different time periods. For powder and heterogeneous coarse samples NIR spectra vary among replicates. Such outlying replicates can be eliminated based on their relative location in the PCA scores plot space (Euclidean distance).

NIR spectra of 18 lots of soy protein hydrolyzate, 12 lots of rice protein hydrolyzate, and 14 lots of chemically defined basic medium were selected out of all provided measurements. NIR spectra were collected between 4,784 $cm^{-1}$ and 8,936 $cm^{-1}$. This spectral region does not contain noisy regions. The observed strong baseline shifts are due to light scattering associated with different raw-material lots having differences in mean particle size distributions (granularity). The analysis of raw spectra without baseline correction allows to focus on variations mainly caused by physical effects. PCA analysis of raw spectra was performed for each raw material separately.

Figure 2:
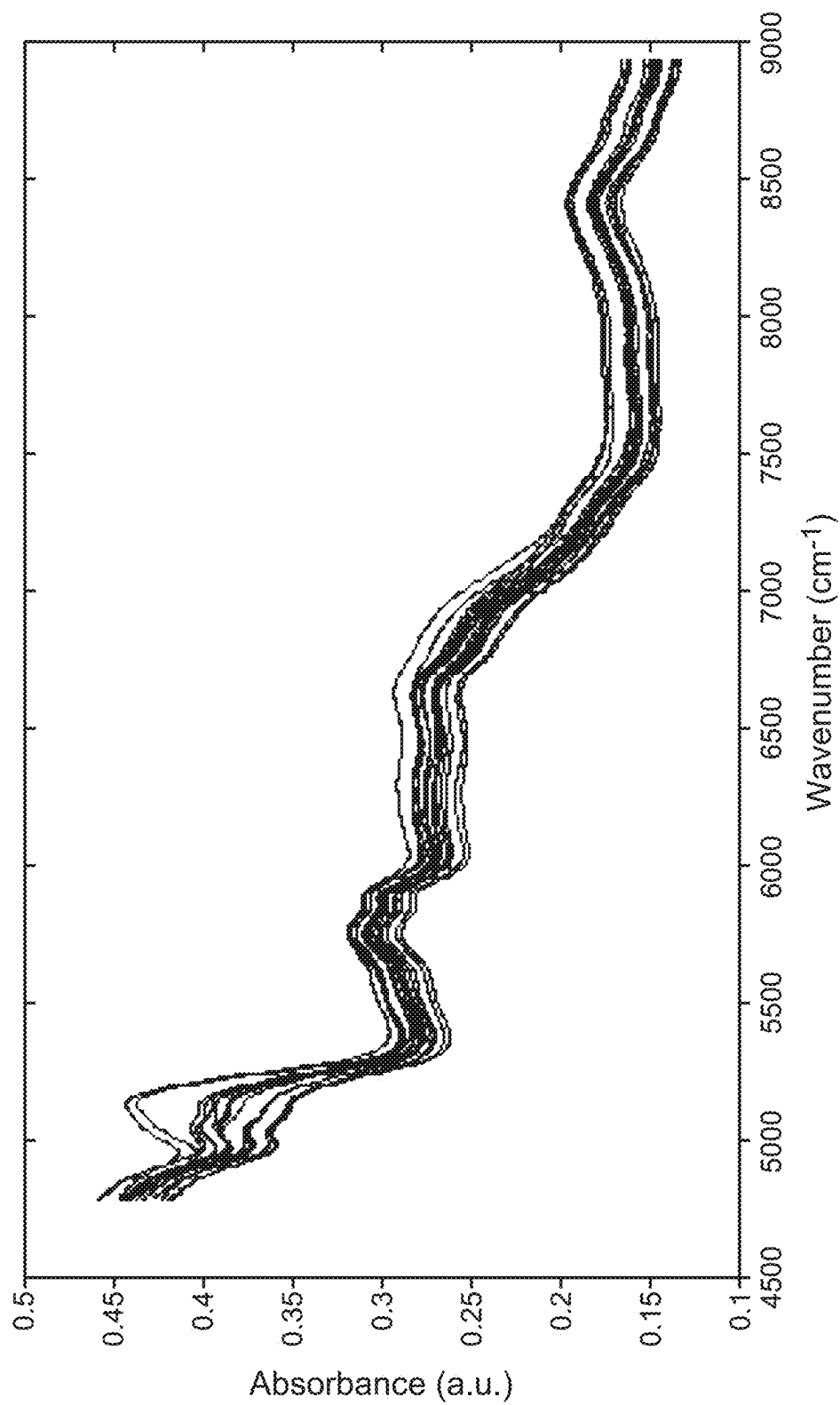
FIG. 2 NIR spectra of different soy protein hydrolyzate lots.

FIG. 1 shows the distribution of the different tested soy protein hydrolyzate lots on a 2-dimensional space built through PCA based on the original NIR spectra, capturing 94% of the NIR spectra variance. The spectral dimensionality was reduced from 1,039 wavenumbers to 3 significant principal components. Lots giving high product yield cannot be discriminated based on this analysis from those giving low product yield. In addition granularity (as seen by different NIR spectra baselines, FIG. 2) and humidity content (as Karl Fischer measurements) of the samples are also different making a clustering of the lots according to any single property very difficult.

Figure 3:
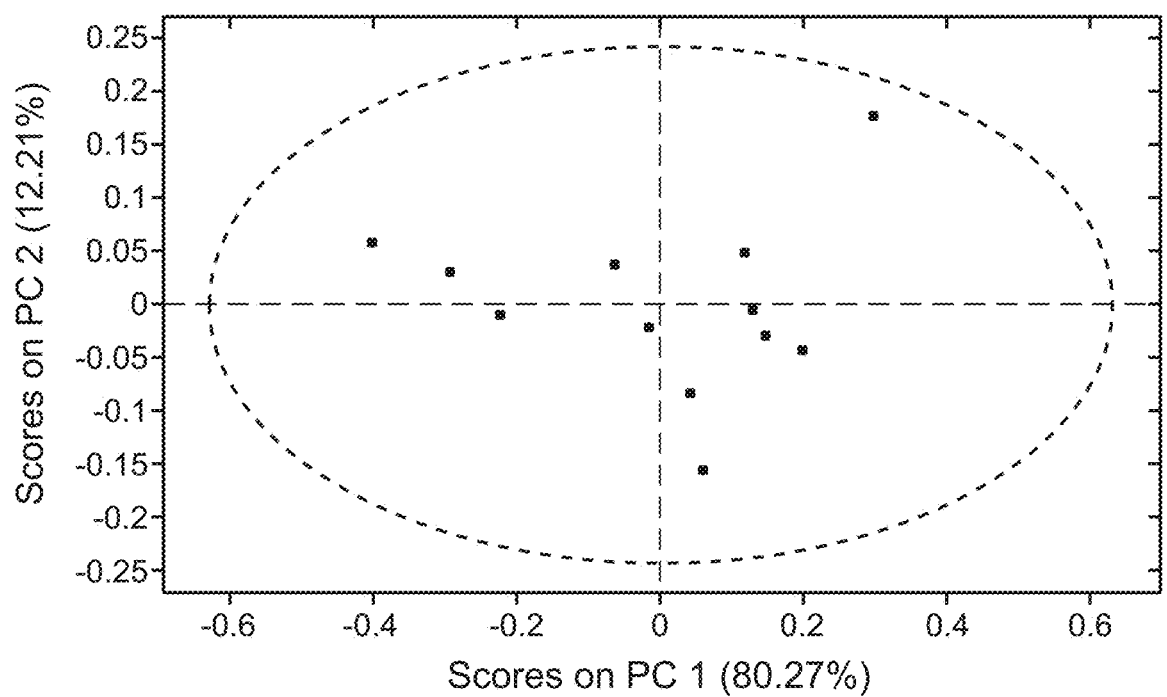
FIG. 3 Distribution of the different tested rice protein hydrolyzate lots on a 2-dimensional space built through PCA based on the original NIR spectra.

FIG. 3 shows how the tested rice protein hydrolyzate lots distribute on a 2-dimensional space built through PCA based on the original NIR spectra, capturing 92% of the NIR spectra variance. As for the soy protein hydrolyzate, lots giving high product yield cannot be discriminated based on this analysis alone from lots giving low product yield. Again, granularity and humidity of the samples change from lot to lot affecting clustering.

Figure 4:
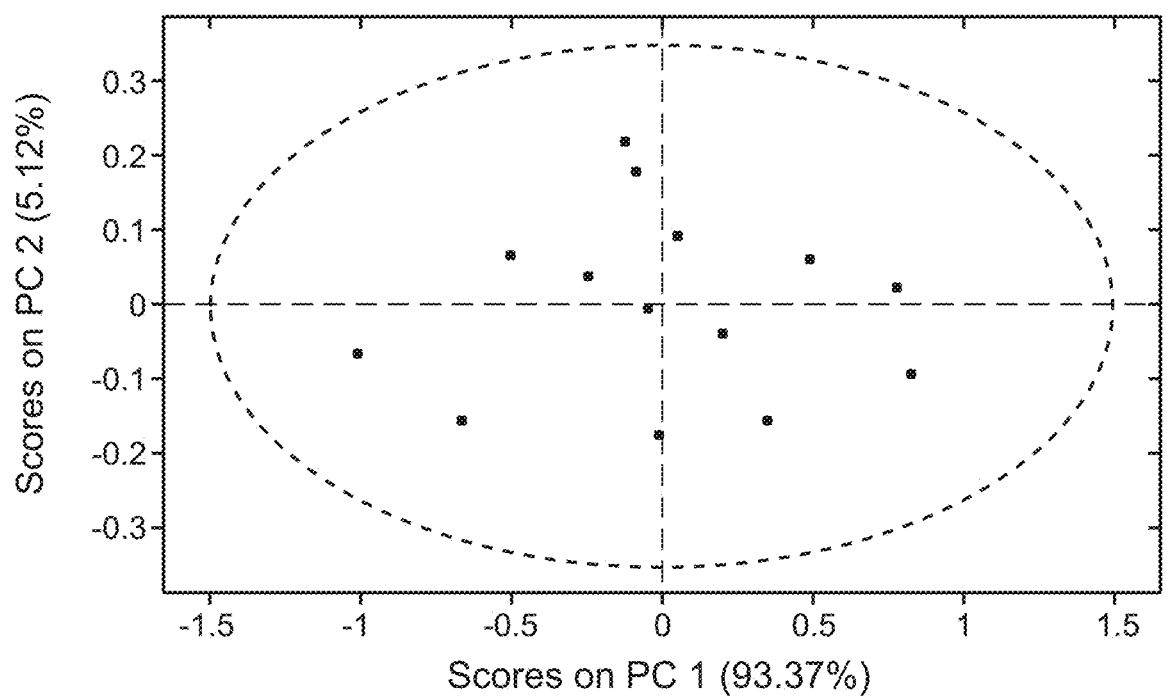
FIG. 4 Distribution of the different tested chemically defined basic medium lots on a 2-dimensional space built through PCA based on the original NIR spectra.

FIG. 4 shows the distribution of lots of the chemically defined basic medium on a 2-dimensional space built through PCA based on the original NIR spectra, capturing 98% of the NIR spectra variance. As for the soy and rice protein hydrolyzates lots giving high product yield cannot be discriminated from those giving low product yield based on this analysis alone.

The three analyzed cultivation media components show significant lot-to-lot variability in granularity and humidity content, as can be seen by the NIR spectra obtained. NIR is very sensitive to both these factors. Additionally both these factors dominate over smaller but still significant chemical composition differences that might be present. Prior to PCA analysis physical information has to be removed by spectra pre-processing.

Water absorbs very strongly in the NIR region especially in the range of from 6,900 $cm^{-1}$ to 7,150 $cm^{-1}$ and of from 5,160 $cm^{-1}$ to 5,270 $cm^{-1}$. These absorption regions are caused by the first overtone of the O—H stretching band and the combination of the O—H stretching and the O—H bending bands, respectively. Water absorption regions can be removed. Moreover, the baseline shift can be eliminated by applying multiplicative scatter correction (MSC). In order to enhance the variance between samples, the Savitzky-Golay filtering and smoothing method can be applied, and spectra can be transformed to their first derivative (window of 25 points).

Figure 5:
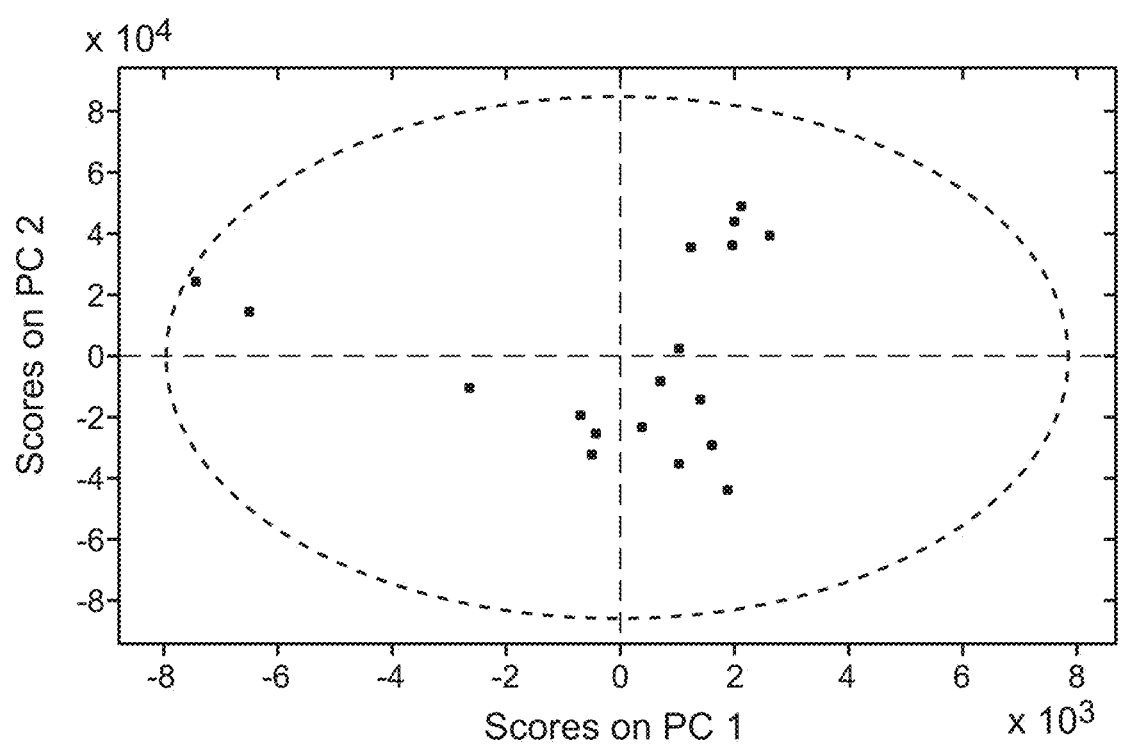
FIG. 5 PCA analysis based on pre-processed spectra of soy protein hydrolyzates lots.

The PCA analysis was performed on previously pre-processed spectra of soy protein hydrolyzates (FIG. 5). Almost all very good to good performing lots in terms of process yield group at the left-hand side of the PCA plot (negative PC1 score values). Conversely, lot 4, which appears to perform poorly, occupies the space on the right-hand side of the plot.

Figure 6:
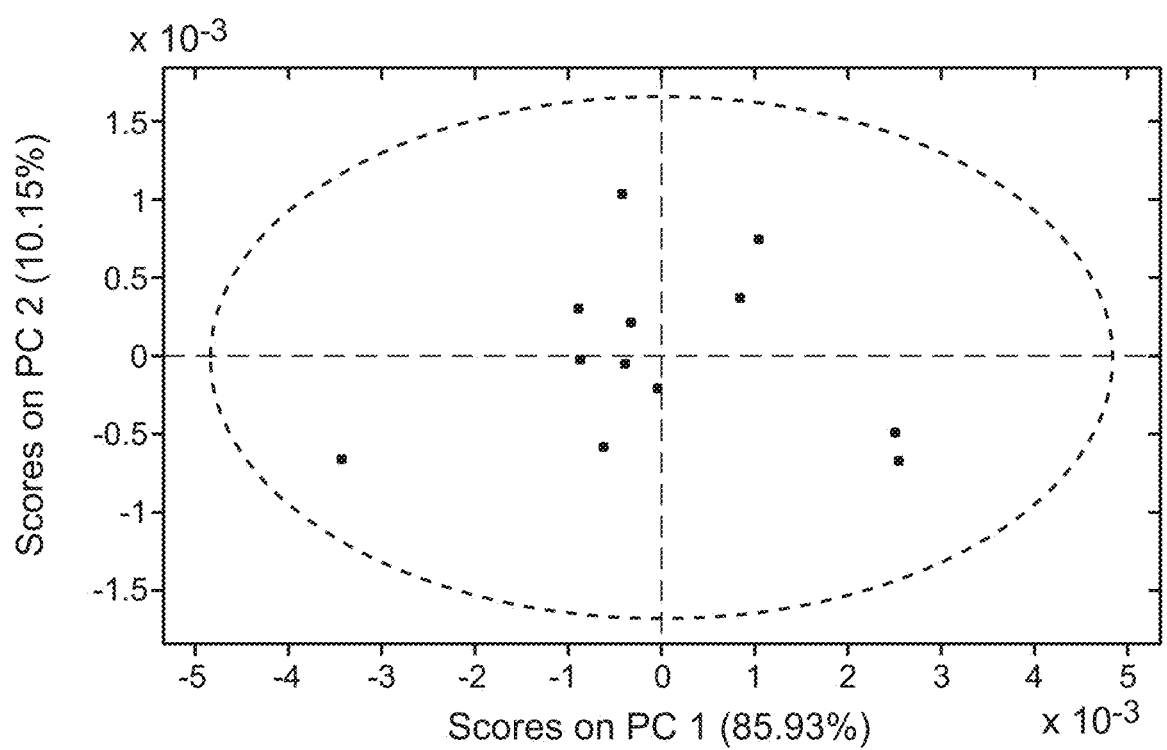
FIG. 6 PCA analysis based on pre-processed spectra of rice protein hydrolyzates lots.

The PCA analysis was performed on previously pre-processed spectra of rice protein hydrolyzates (FIG. 6). Lots giving very similar yields cluster together, thus, showing that PCA of pre-processed spectra is adequate and that there is already some lot-to-lot variability that can be traced to chemical composition of this component raw-material, which is unrelated to granularity or moisture level.

Figure 7:
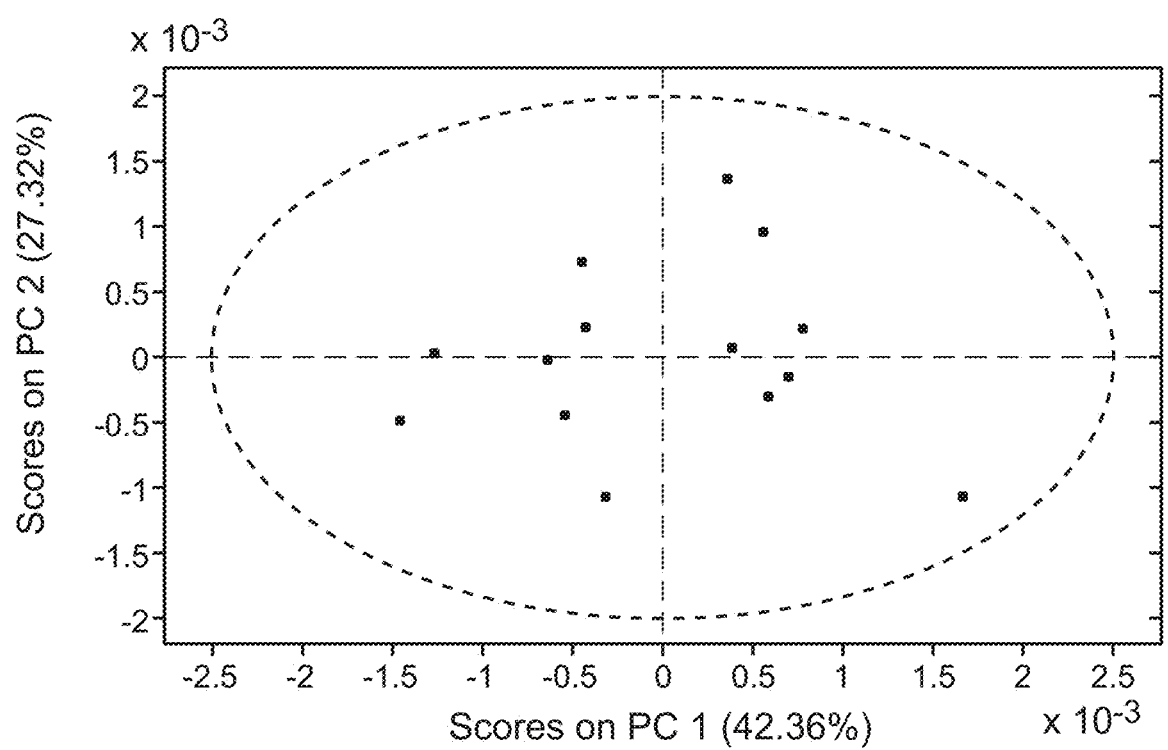
FIG. 7 PCA analysis based on pre-processed spectra of chemically defined basic medium lots.

The PCA analysis of the chemically defined basic mediums' pre-processed spectra (FIG. 7) shows that in general all very good to good performing lots group at the left-hand side of the PCA plot (negative score values of PC1). Conversely, lot 3, which appears to perform poorly, occupies the space on the right-hand side of the plot. Those results are comparable with the results obtained for the protein hydrolyzate lots.

Figure 8:
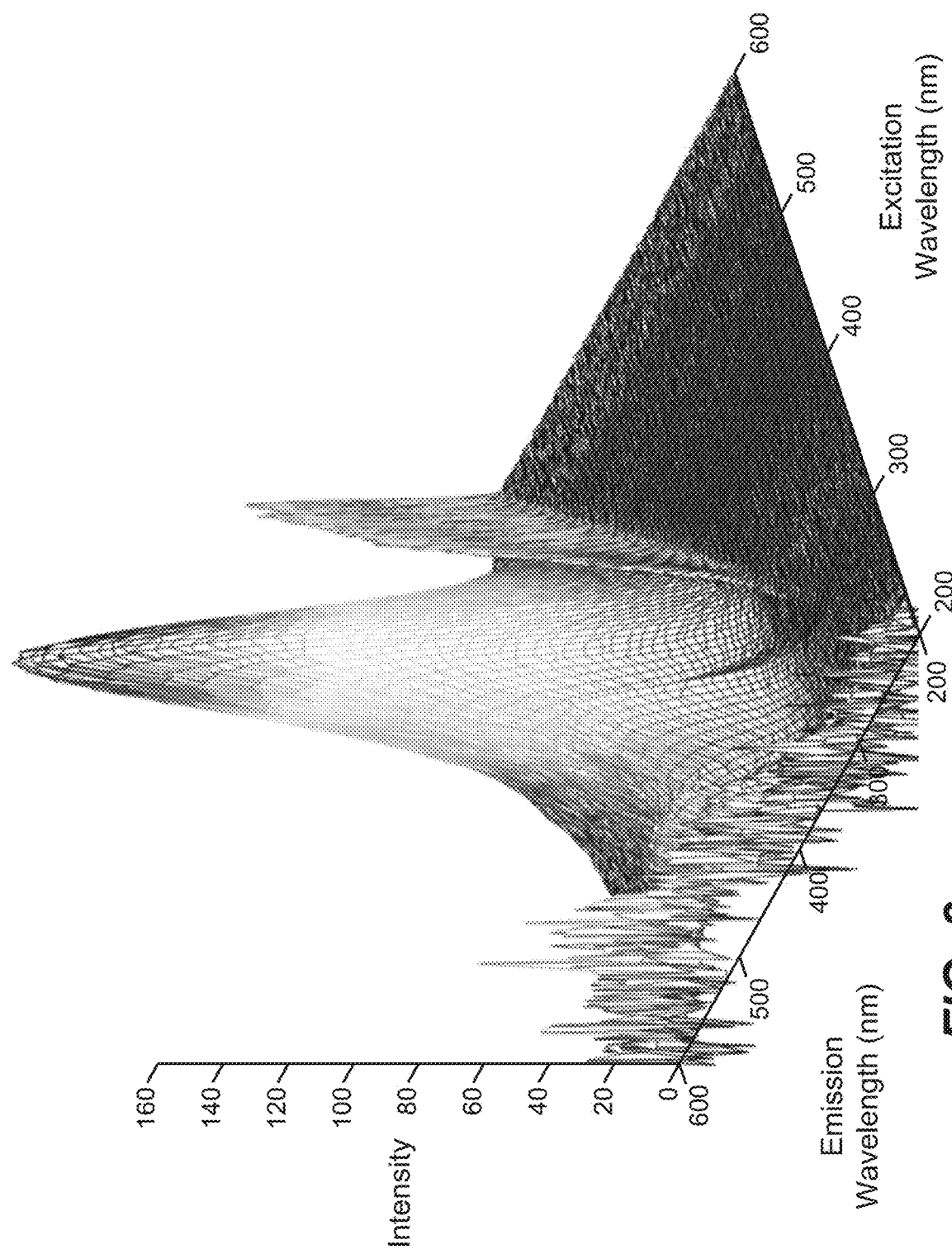
FIG. 8 Fluorescence EEM landscape of a soy protein hydrolyzate lot samples.

Besides NIR spectra, fluorescence excitation-emission spectra (EEM) acquired of different water soluble fermentation raw-materials can be analyzed. A three-way data array, with excitation wavelengths along the x-axis, emission wavelengths along the y-axis, and intensity along the z-axis can be established. In FIG. 8 a fluorescence EEM landscape of a soy protein hydrolyzate lot samples is shown.

2D-Fluorescence spectra of 19 lots of soy protein hydrolyzate, of 12 lots of rice protein hydrolyzate, and of 14 lots of chemically defined basic medium were obtained. The spectra were obtained using excitation wavelengths from 200 nm to 600 nm, with intervals of 5 nm, and emission wavelengths also from 200 nm to 600 nm, with intervals of 2 nm, giving a total of 81 excitation and 201 emission wavelengths.

In order to allow a prediction of cultivation yield based on the analysis of the raw material a three-way array for each of the raw materials can be generated from the individual matrices.

A typical EEM spectrum can be influenced by Rayleigh and Raman scattering effects, which affect the information content of the fluorescence landscape. To overcome the Rayleigh effect several strategies and techniques can be used:
- zeroing the emission wavelengths smaller than the excitation ones;
- inserting missing values in the region of scattering;
- excluding the region of scattering and interpolating the removed points; or
- subtracting the background spectra.

Figure 9:
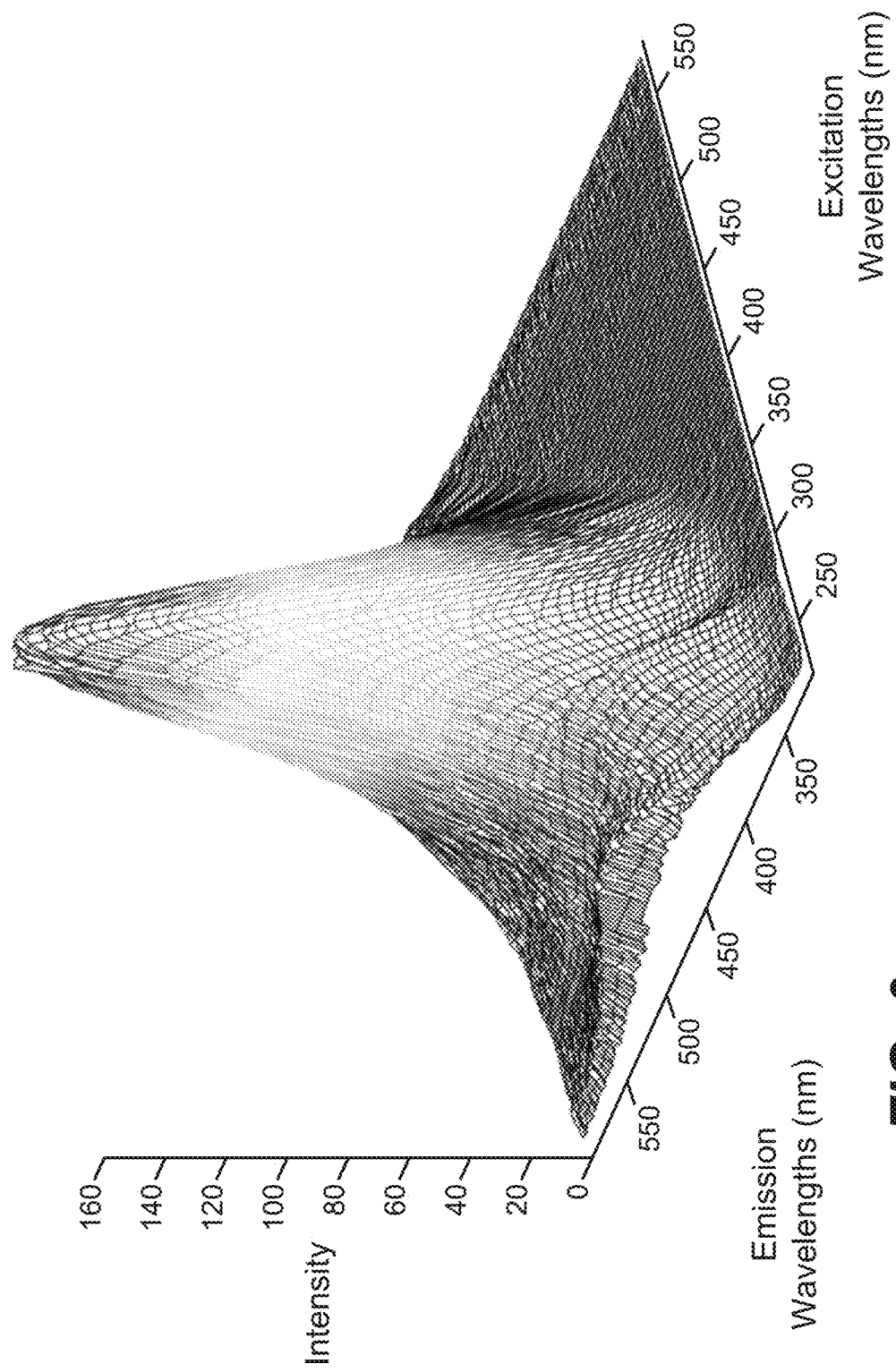
FIG. 9 Processed fluorescence EEM landscape of a soy protein hydrolyzate lot samples.

It has been found that excluding the region of scattering and the interpolation of the removed points is most suited in the method as reported herein. The Matlab© algorithm EEMscat can be employed therefore. This algorithm can be downloaded free from world-wide-web site: htttt://www-.models.kvl.dk/source/EEM_correction/. With this proceeding the scattering can be removed completely. The spectrum also shows pronounced noise along the entire emission axis in the first excitation wavelength. This region (200 nm to 225 nm) was excluded from the spectra, as well the non-informative emission wavelengths (200 nm to 315 nm and 596 nm to 600 nm) and excitation wavelengths (580 nm to 600 nm). The resulting spectrum is shown in FIG. 9.

The final soy protein hydrolyzate spectra are made up by the emission wavelength range of 320 nm to 594 nm and the excitation wavelength range of 230 nm to 575 nm, resulting in an array of 19×138×70 elements. The same procedure can be followed for the rice protein hydrolyzates and the chemically defined basic medium datasets. Thus, the final rice protein hydrolyzate spectra are comprised of the emission and excitation wavelength range of 290 nm to 594 nm and 230 nm to 550 nm, respectively, resulting in an array of 12×153×65 elements. The final chemically defined basic medium spectra comprises the emission wavelength range of 290 nm to 594 nm and the excitation wavelength range of 230 nm to 550 nm, resulting in an array of 14×162×60 elements.

In conclusion, a pre-processing of the EEM spectra can be performed for each raw material data set to enhance signal to noise ratio. The differences between each raw material can thus be clearly seen: the soy protein hydrolyzate comprises 2 or 3 fluorophores, the rice protein hydrolyzate comprises 3 fluorophores and the chemically defined basic medium comprises more than 4 fluorophores.

Figure 10:
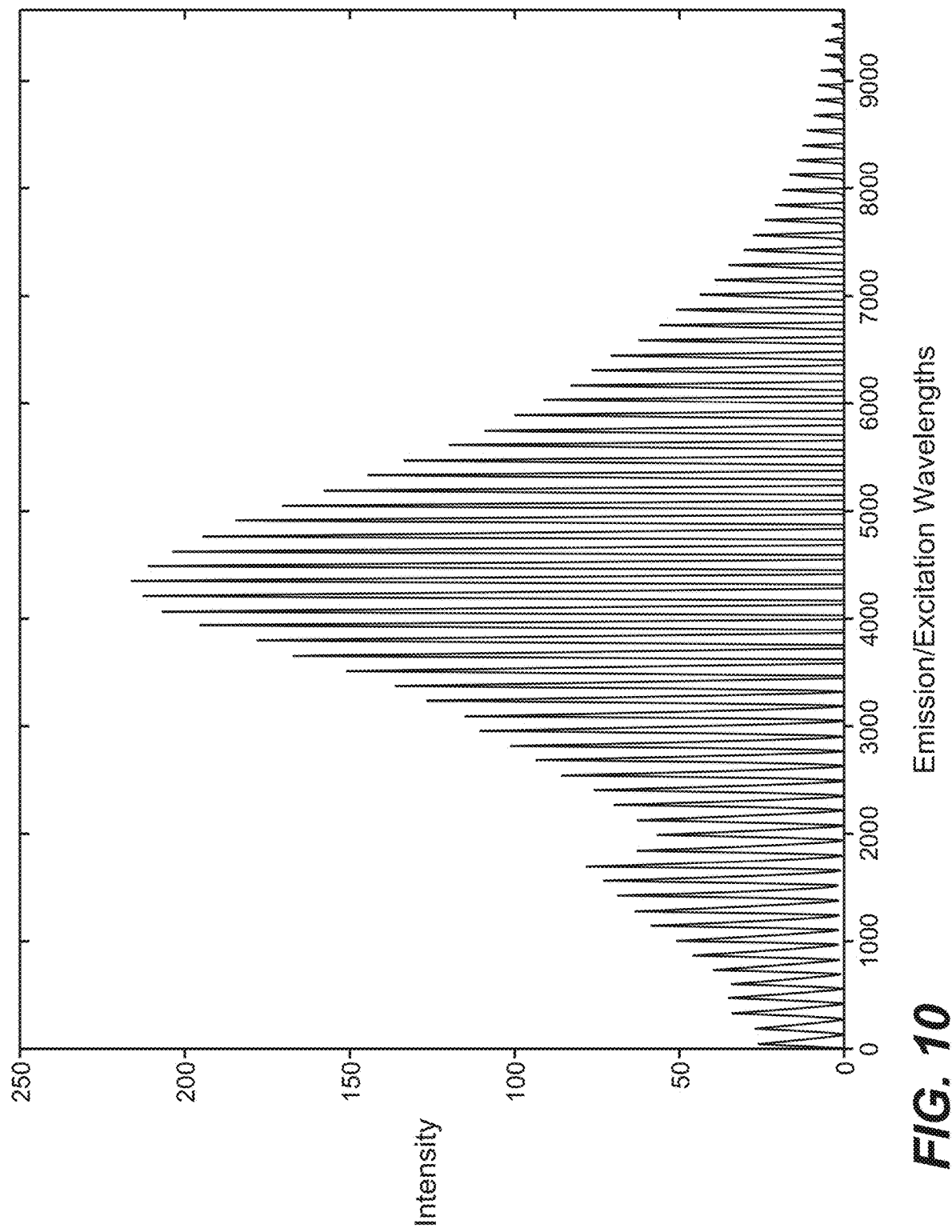
FIG. 10 Unfolded fluorescence landscapes into a row of emission spectra.

In order to obtain an overview of raw material lot-to-lot variability, a PCA of the unfolded fluorescence data array can be carried out for each component raw material. The unfolding procedure can be applied in any of the three modes of a three-way array. In order to enhance the lot-to-lot differences the unfolding preserving information of the first mode (samples) can be employed. In this way, the fluorescence landscapes can be unfolded into a row of emission spectra one after the other (FIG. 10).

Figure 11:
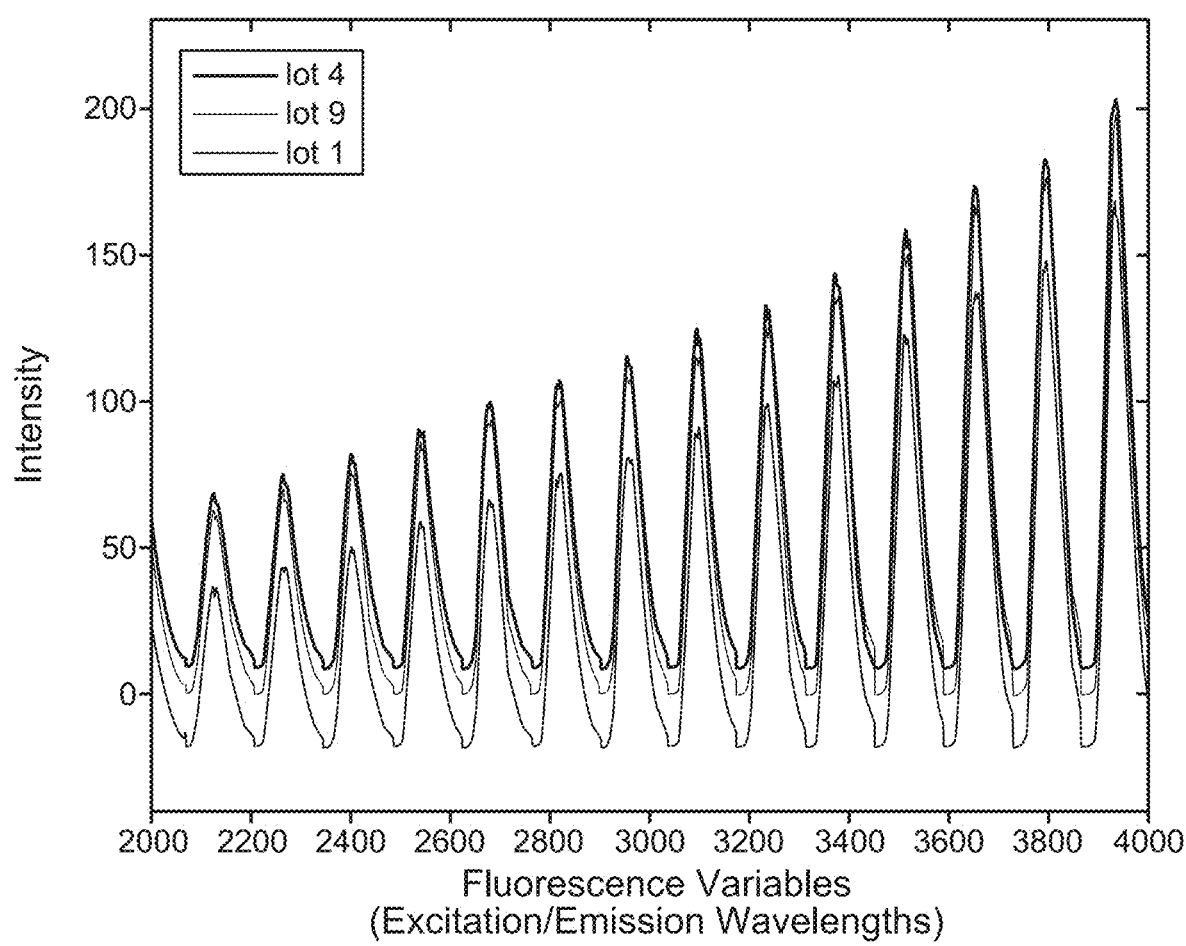
FIG. 11 Excerpt of unfolded spectra for three different lots of soy protein hydrolyzate.

The dimensions of the soy protein hydrolyzate array are 19×138×70 (lot×emission wavelength×excitation wavelength). After the unfolding strategy, a two-way matrix of size 19×9,960 can be obtained. FIG. 11 shows a small part of the resulting spectra for three different lots of soy protein hydrolyzate. Noise in the extreme excitation wavelengths can be seen.

To overcome these deviations, several strategies can be used. It has been found that the Savitzky-Golay smoothing using a window of 19 points and $2^{nd}$ order polynomial to remove noise is best suited, and the Multiplicative Scatter Correction (MSC) is best suited to eliminate the baseline drift.

Figure 12:
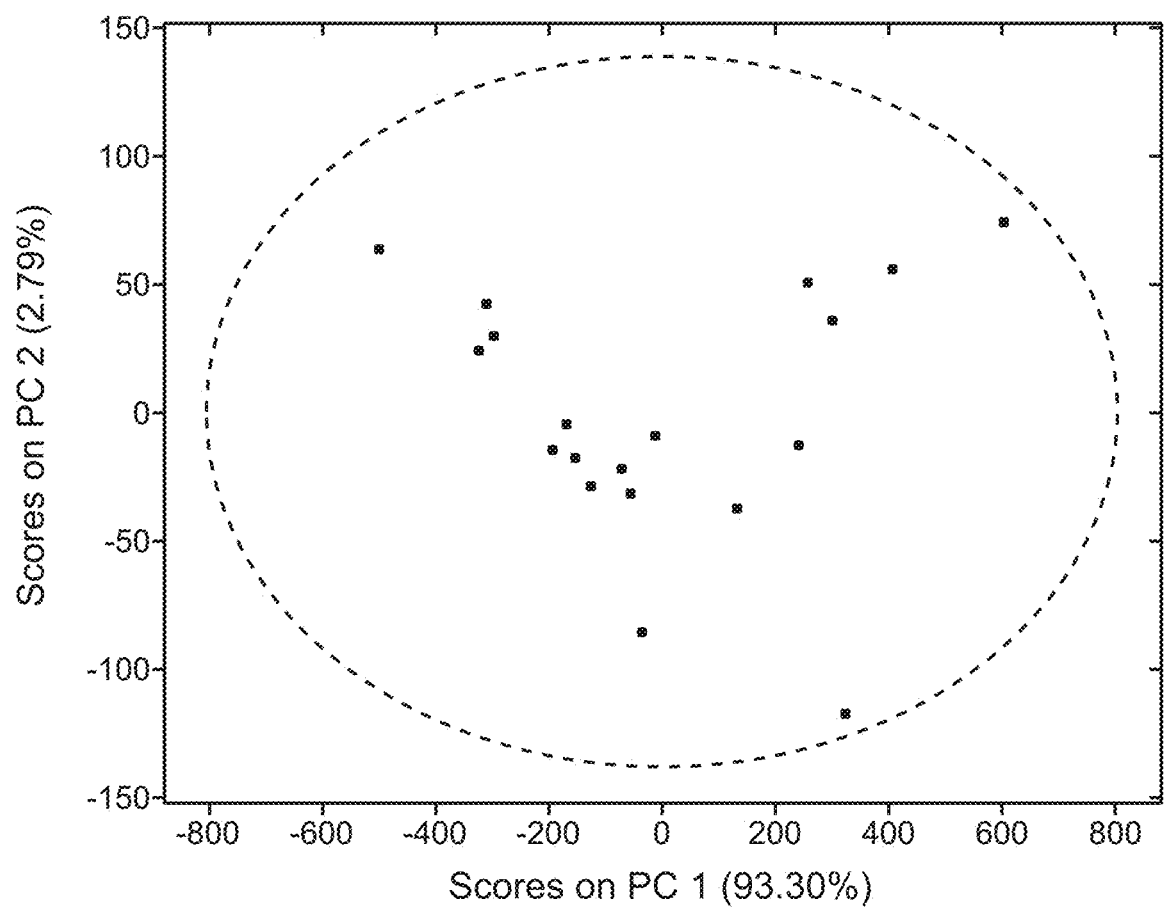
FIG. 12 Score plot of PC1×PC2 of a PCA for soy protein hydrolyzates of the unfolded EEM landscape.

Unfolded-PCA was applied to the soy protein hydrolyzate pre-processed matrix. The data was mean-centered, and the optimal number of principal components was chosen using the leave-one-out cross validation method. FIG. 12 shows the score plot of PC1×PC2 of a PCA covering 96% of variance found on the whole unfolded EEM landscape.

Figure 13:
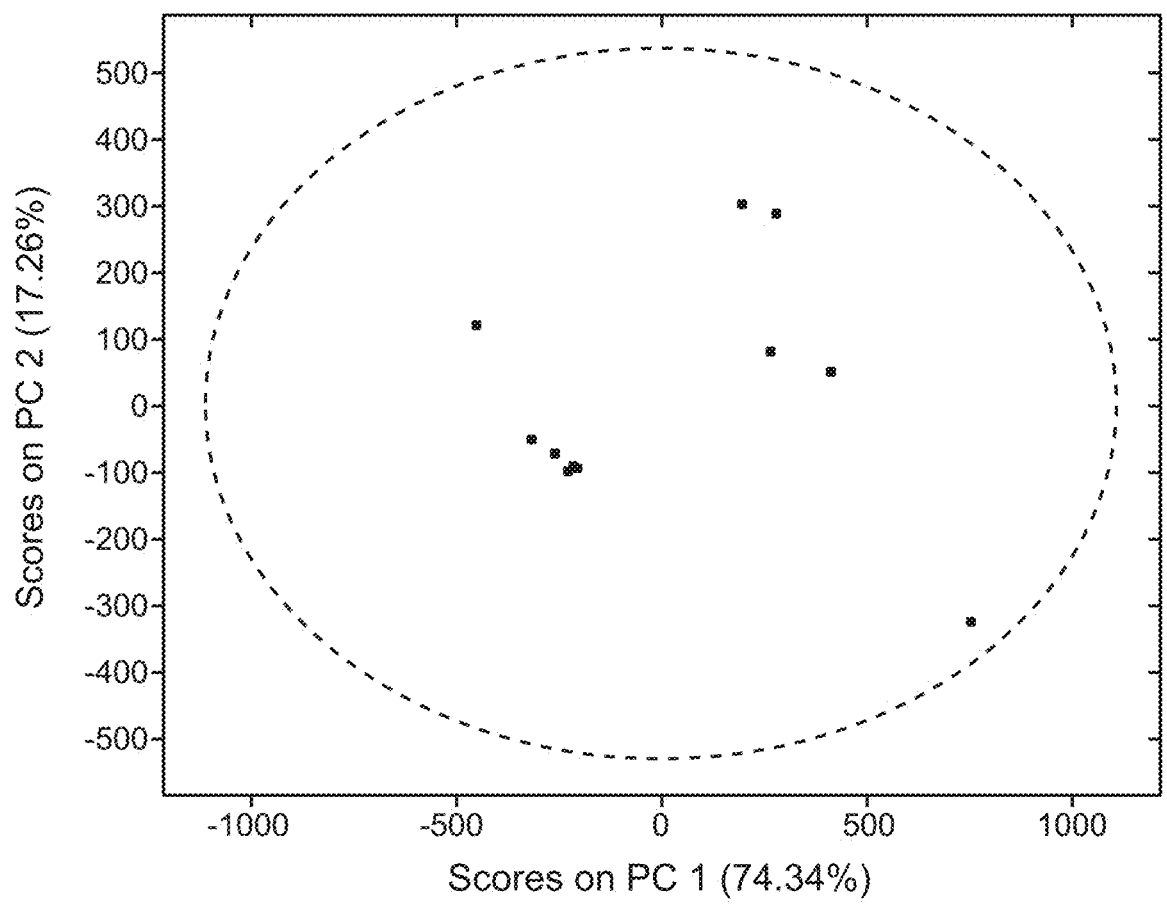
FIG. 13 Score plot of PC1×PC2 of a PCA for rice protein hydrolyzates of the unfolded EEM landscape.

After unfolding the resulting rice protein hydrolyzate matrix had the size 12×9,945. The same pre-processing used for soy protein hydrolyzate was applied. FIG. 13 shows the score plot of PC1×PC2 of a PCA using three principal components covering more than 98% of the variance in the unfolded EEM spectra.

Figure 14:
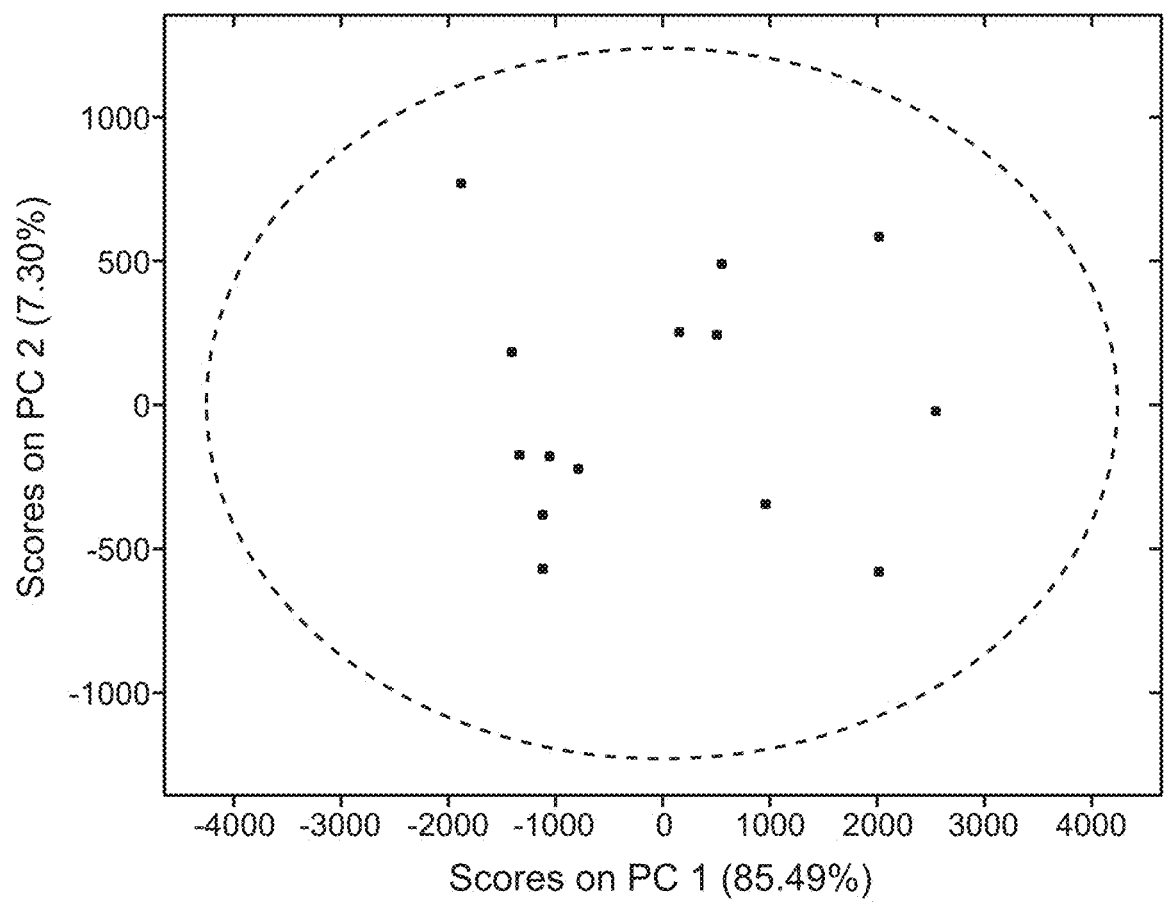
FIG. 14 Score plot of PC1×PC2 of a PCA for chemically defined basic medium of the unfolded EEM landscape.

The size of unfolded chemically defined basic medium matrix was 14×9,600. The same EEM spectra pre-processing procedure as applied to the other two media components was used. FIG. 14 shows the score plot of PC1×PC2 of a PCA using two principal components covering more than 92% of the total variance in the unfolded EEM spectra. As before with NIR spectra for the same media components it was found that lots giving higher yields are separated from lots giving lower yields in the PCA score plots of EEM unfolded spectra.

A PLS model can be developed for predicting the product yield at the end of the process based on NIR and/or fluorescence spectra obtained for different lots of each media component and/or their combinations. The PLS algorithm is given an X block (pre-processed spectra, with or without variable selection) and a Y block (product parameter) and correlates both by finding the variation in X responsible for changes in Y (i.e. maximizing the covariance between both blocks). A basic set can be defined wherein most of the different lots of raw materials can be included. Out of replicate batches having same the lot combinations, the one giving the highest product yield was selected for the calibration dataset (Table 7).

TABLE 7

| batch | soy protein hydrolyzate F/ZF lot No. | product at 330 h [mg/l] |
| --- | --- | --- |
| D52KD13 | 1 | 1458 |
| D52KD22 | 4 | 1232 |
| D55KD13 | 5 | 1430 |
| D55KD23 | 3 | 1257 |
| D55KD31 | 6 | 1263 |
| D73KD13 | 2 | 1120 |
| D73KD33 | 7 | 1044 |
| D79KD22 | 8 | 1162 |

NIR spectra can be pre-processed as described before to remove the influence of physical effects originating from different particle size distributions. As no replicate spectra were used, the leave-one-out cross-validation method was used as internal validation strategy.

Figure 15:
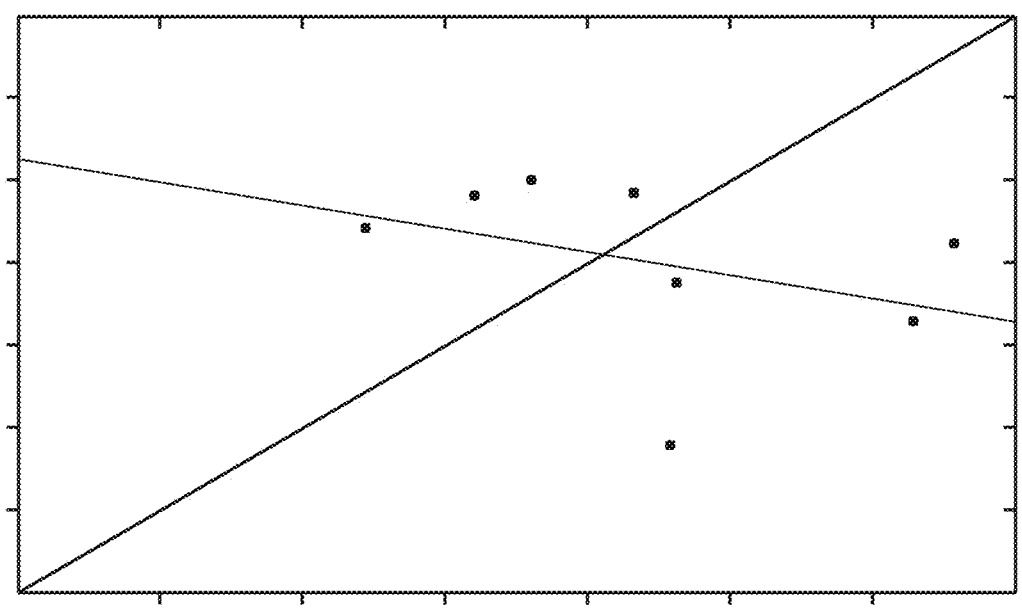
FIG. 15 Measured vs. cross-validation predicted plot.

The obtained model was made up of only two LVs but a non-significant $R^2$ of 0.139 was obtained. The measured vs. cross-validation predicted plot is presented in FIG. 15.

A PLS model correlating NIR spectra of different lots of the chemically defined basic medium and product yield can be built using the calibration dataset as presented in Table 8.

TABLE 8

| batch | chemically defined basic medium F/ZF lot No. | product at 330 h [mg/l] |
|---|---|---|
| D45KD11 | 1 | 1314 |
| D52KD13 | 2 | 1458 |
| D61KD12 | 3 | 1134 |
| D73KD21 | 4 | 1147 |
| D79KD22 | 5 | 1162 |

Figure 16:
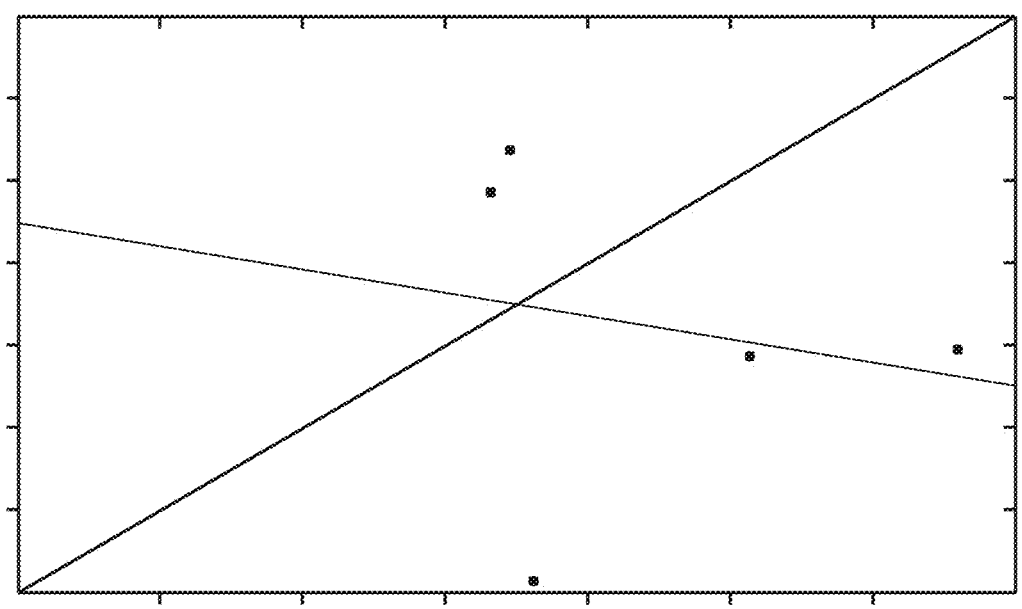
FIG. 16 PLS model correlating NIR spectra of different lots of the chemically defined basic medium and product yield.

The obtained model was made up of only two LVs but again a non significant $R^2$ of 0.04 was obtained (FIG. 16).

Considering not only one medium component, but the two most relevant ones influencing yield, and also taking into account that different chemical information is captured by each different spectroscopic method used, a combination strategy can be used between same spectroscopic/different media components and also between different spectroscopic/different media components.

The criteria used for selecting calibration and validation batches were based in getting the widest range possible during calibration (Table 9).

TABLE 9

| | batch | soy protein hydrolyzate F/ZF lot No. | chemically defined basic medium F/ZF lot | product at 330 h [mg/l] |
|---|---|---|---|---|
| calibration | D45KD11 | 1 | 1 | 1314 |
| | D45KD31 | 3 | 1 | 999 |
| | D52KD13 | 1 | 2 | 1458 |
| | D52KD22 | 4 | 2 | 1232 |
| | D55KD13 | 5 | 2 | 1430 |
| | D55KD31 | 6 | 2 | 1263 |
| | D61KD12 | 3 | 3 | 1134 |
| | D73KD13 | 2 | 4 | 1120 |
| | D73KD33 | 7 | 4 | 1044 |
| | D79KD22 | 8 | 5 | 1162 |
| validation | D45KD23 | 2 | 1 | 1061 |
| | D55KD23 | 3 | 2 | 1257 |
| | D73KD21 | 8 | 4 | 1147 |

External validation was done with one third of the data set. Calibration and validation data (NIR spectra) were pre-processed in the same manner as described before. The obtained prediction model is based on 3 LVs and the obtained $R^2$ reached a significant value of 0.88.

Figure 17:
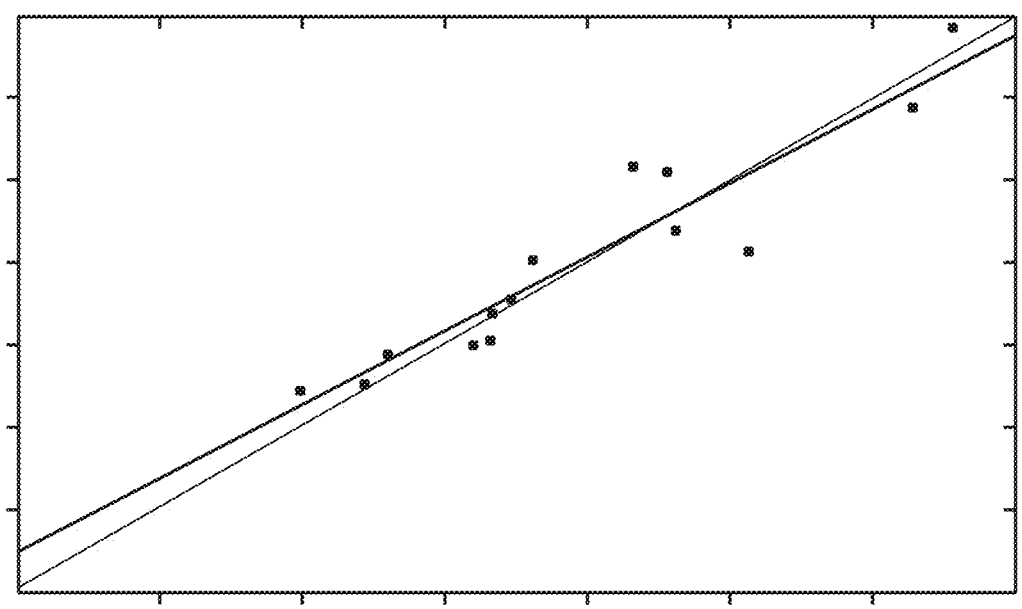
FIG. 17 PLS model correlating NIR spectra of different lots of the soy protein hydrolyzate and the chemically defined basic medium and product yield.

Model accuracy and long term robustness is reflected in a high $R^2$ with both calibration and validation errors being low, with a small difference between RMSECV and RMSEP (FIG. 17). In the above case, the prediction error was low (RMSEP=36 mg/l) and did not differ much from the RMSECV (126 mg/l).

Thus, it has been found that product yield can be correlated to spectroscopic data from different compounds of a cultivation medium obtained with a combination of spectroscopic information of same nature (NIR) for the two (most important) process raw-materials or media components. Each spectrum has 944 wavenumbers and the entire calibration dataset included in the model is represented by 18,880 variables (10 samples×2 raw materials×944 wavenumbers after variable selection). In order to reduce the required workload a PCA analysis based on the spectra that were first compressed by converting the contained information into a few non-correlated variables was performed. The therewith obtained model was simpler and contained only 2 latent variables (LV) and an $R^2$ of 0.81 was obtained.

Different spectroscopic methods capture complementary chemical information. Using two different types of spectroscopic information improved the predictive quality of the model. Therefore, fluorescence spectra of soy protein hydrolyzate and NIR spectra of the chemically defined basic medium were used (Table 10).

TABLE 10

| | batch | soy protein hydrolyzate F/ZF lot No. | chemically defined basic medium F/ZF lot No. | product at 330 h [mg/l] |
|---|---|---|---|---|
| calibration | D45KD11 | 1 | 1 | 1314 |
| | D45KD31 | 3 | 1 | 999 |
| | D52KD13 | 1 | 2 | 1458 |
| | D52KD22 | 4 | 2 | 1232 |
| | D55KD13 | 5 | 2 | 1430 |
| | D55KD31 | 6 | 2 | 1263 |
| | D61KD12 | 3 | 3 | 1134 |
| | D73KD13 | 2 | 4 | 1120 |
| | D73KD33 | 7 | 4 | 1044 |
| | D79KD22 | 8 | 5 | 1162 |
| validation | D45KD23 | 2 | 1 | 1061 |
| | D55KD23 | 3 | 2 | 1257 |
| | D73KD21 | 8 | 4 | 1147 |

Figure 18:
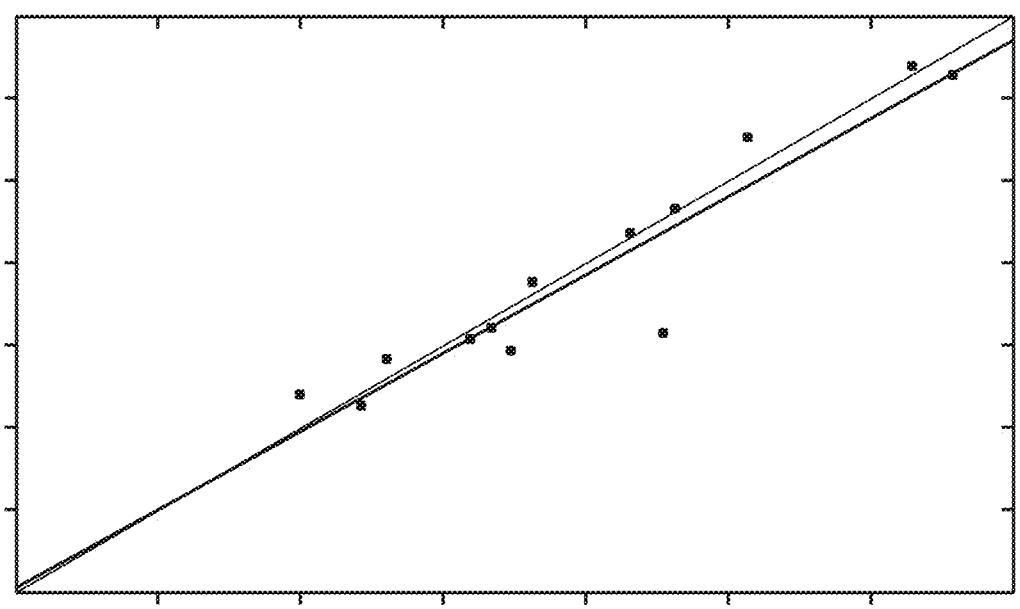
FIG. 18 PLS model correlating fluorescence spectra of different lots of the soy protein hydrolyzate and NIR spectra of different lots of the chemically defined basic medium and product yield.

Fluorescence spectra and NIR spectra were compressed to a few principal components after pre-processing as described before. The obtained model has only 3 latent variables and an $R^2$ of 0.90 was obtained (FIG. 18). This model has better performance when compared to previous models and is more robust since it not only has higher $R^2$ value, but also has lower RMSECV and RMSEP values (ca. 90 mg/l) with a very small difference between them.

Figure 19:
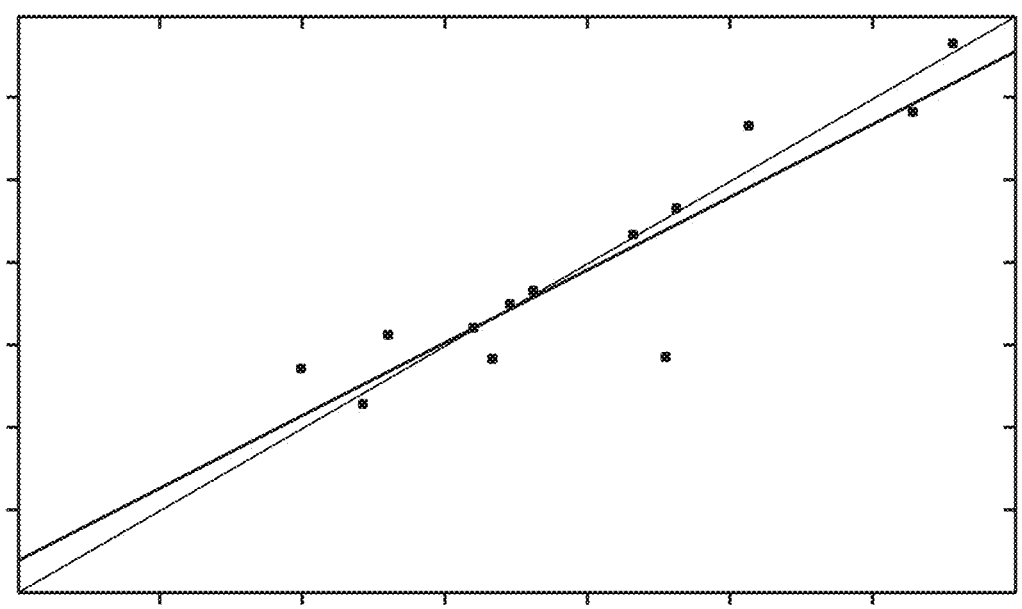
FIG. 19 PLS model correlating fluorescence spectra of different lots of the soy protein hydrolyzate and MIR spectra of different lots of the chemically defined basic medium and product yield.

A further test was made using MIR instead of NIR for the chemically defined basic medium. Calibration and validation datasets used were the same as presented before (see Table 10). Fluorescence and MIR spectra were pre-processed as described before. The obtained model has 3 latent variables, an $R^2$ of 0.88, and low RMSECV and RMSEP values with no difference between them (ca. 100 mg/l both), thus showing no significant difference to the one obtained with the NIR data for the chemically defined basic medium (FIG. 19).

Figure 20:
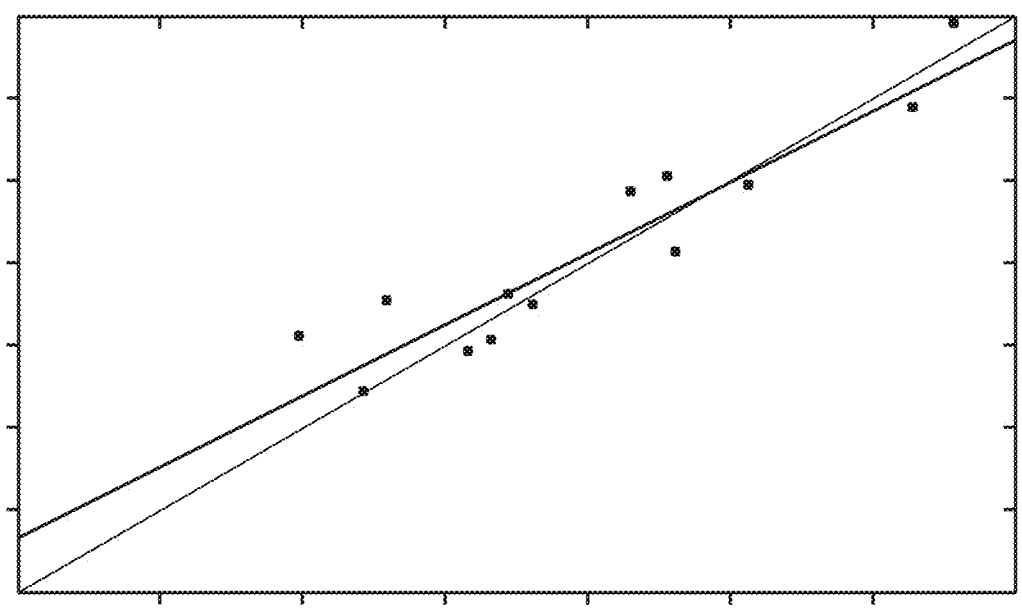
FIG. 20 PLS model correlating NIR spectra of different lots of the soy protein hydrolyzate and fluorescence spectra of different lots of the chemically defined basic medium and product yield.

The NIR spectra of the soy protein hydrolyzate and fluorescence spectra of the chemically defined basic medium were joined together and the resulting model was evaluated. The calibration and validation datasets used for building the model were the same as before (see Table 10). The obtained model has 3 latent variables and a very similar $R^2$ value (0.87) (FIG. 20) and RMSECV and RMSEP values (124 mg/l and 60 mg/l, respectively).

With an analytical variance for the reference analytics of product at around 60 mg/l (5% of 1200 mg/l the average product concentration) most models developed showed a prediction accuracy very close to the experimental limit.

In conclusion, to achieve a prediction of product yield at 330 h, spectral information of both soy protein hydrolyzate and chemically defined basic medium must be used. The use of fluorescence spectroscopy data for the chemically defined basic medium gives slightly lower (but even though very comparable) prediction errors, than models based on NIR spectroscopic data for the chemically defined basic medium and 2D-Fluorescence spectroscopic data for the soy protein hydrolyzate.

The method as reported herein is directed to the combination of spectra of different nature (fluorescence spectra and IR spectra), which intrinsically have different dimensions (two (2D) and one (1D), respectively), and that requires the operations of first compressing each spectrum to principal component analysis scores and second producing linear combinations of each spectrum scores. The spectra of different nature are combined by means of a dimensional reduction and a linear combination of those reduced transformed variables (PCA scores obtained by compressing each spectrum).

Thus, in the method as reported herein spectra of different dimensions and nature are used to capture in a mixture of two different fermentation raw materials the components responsible for fermentation performance of said raw materials and to make predictions of fermentation yields for a specific combination of lots.

With the method as reported herein it is possible to predict based on the spectra of two different raw materials to be used in a fermentation process performance 10 to 14 days in advance by determining the conditions at harvest of the fermentation.

The following examples and figures are provided to aid the understanding of the present invention, the true scope of which is set forth in the appended claims. It is understood that modifications can be made in the procedures set forth without departing from the spirit of the invention.

Example

Materials and Methods
Cell Culture:

The cells were cultivated in shake flasks in a temperature, humidity and carbon dioxide controlled environment. In order to compare different lots, media were prepared with these lots and cells were inoculated in shake flasks containing these media. A certain volume of feed medium was added daily to the shake flask culture in order to prolong cell growth and achieve higher product concentrations.

Figure 21:
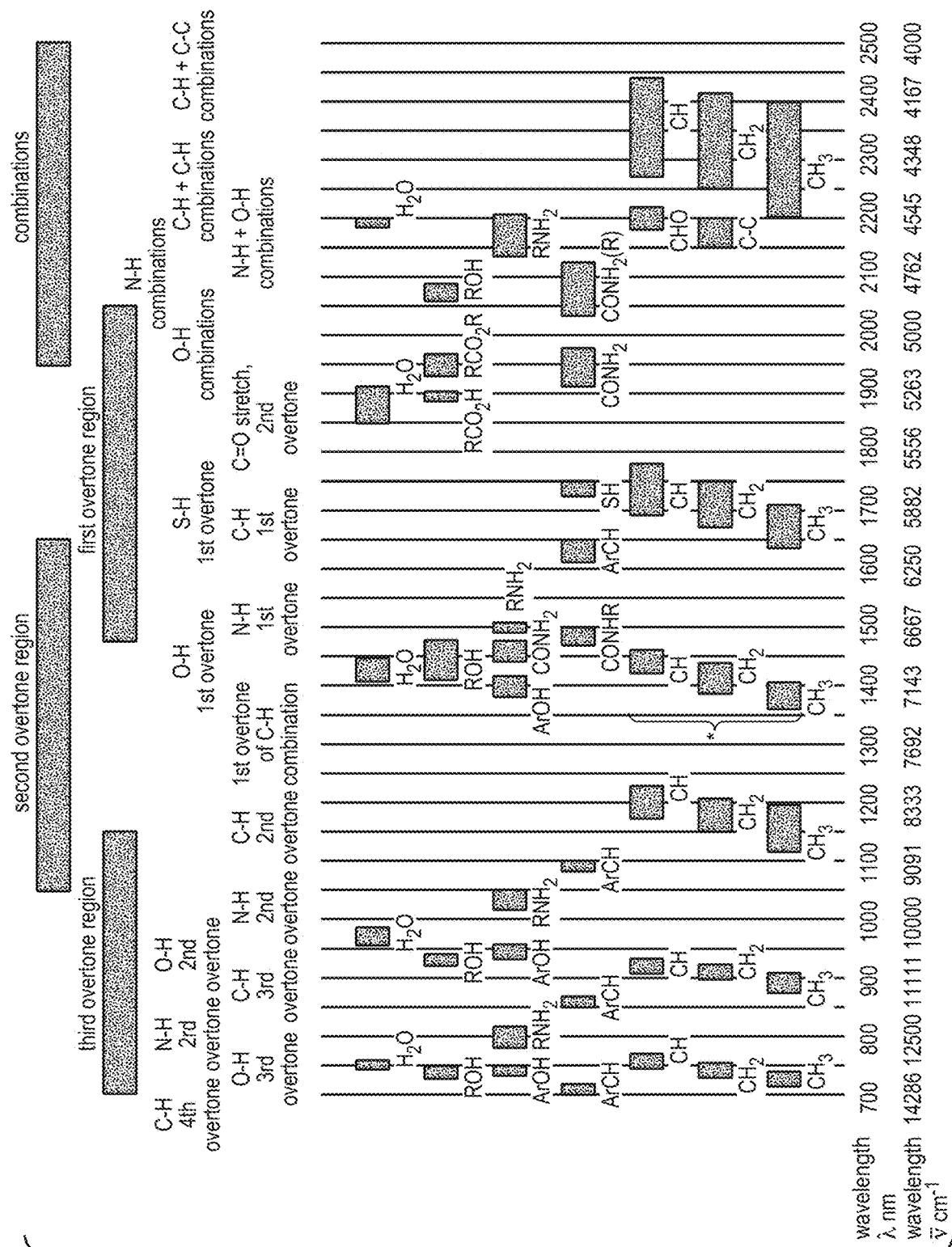
FIG. 21 NIR absorption radiations of overtone and combination bands of covalent bonds organic molecules.

Near Infrared Spectroscopy (NIR):

NIR emerges in 1960s into the analytical world, with the work of Karl Norris of the US Department of Agriculture (Siesler et al, 2002). In the electromagnetic spectrum, the NIR region is located in between Mid-Infrared and Visible. In a range of wavenumber 4,000-14,000 $cm^{-1}$ (respectively wavelength 700-2,500 nm), the absorption radiation of overtone and combination bands of covalent bonds such as N—H, O—H and C—H of organic molecules (FIG. 21).

NIR spectra were collected using flat bottom scintillation vials in a Bruker® MPA FT-NIR system, equipped with a tungsten-halogen source and an InAs detector. Each spectrum was recorded in the wavenumber range of 4,999 to 9,003 $cm^{-1}$, in an average of 32 scans and a spectral resolution of 8 $cm^{-1}$.

Mid Infrared Spectroscopy (MIR):

Mid Infrared Spectra were obtained using quartz cuvettes in an Avatar 370 FT-IR, Thermo Fischer, Diamant ATR. Each spectrum was recorded in the wavenumber range of 4,000 to 400 $cm^{-1}$.

Fluorescence Spectroscopy:

Fluorescence spectroscopy uses irradiation at a certain wavelength to excite molecules, which will then emit radiation of a different wavelength. This technique is often used for studying the structure and function of macromolecules, especially protein interactions. Tentative assignment of fluorescence characteristics of chromophores found in proteins and nucleic acids is presented in the following Table.

| Substance | Absorption | | Fluorescence | |
|---|---|---|---|---|
| | $I_{max}$ (nm) | $\square_{max}$ ($10^{-3}$) | $I_{max}$(nm) | $f_F$ |
| tryptophan | 280 | 5.60 | 348 | 0.20 |
| tyrosine | 274 | 1.40 | 393 | 0.14 |
| phenylalanine | 257 | 0.20 | 282 | 0.04 |
| adenine | 260 | 13.40 | 321 | $2.60 \times 10^{-4}$ |
| guanine | 275 | 8.10 | 329 | $2.60 \times 10^{-4}$ |
| cytosine | 267 | 6.10 | 313 | $0.80 \times 10^{-4}$ |
| uracil | 260 | 9.50 | 308 | $0.40 \times 10^{-4}$ |
| NADH | 340 | 6.20 | 470 | 0.02 |

2D-fluorescence spectra of cell culture raw materials were obtained using excitation wavelengths from 200 nm to 600 nm, with intervals of 5 nm, and emission wavelengths also from 200 nm to 600 nm, but with intervals of 2 nm, giving a total of 81 excitation and 201 emission wavelengths. Emission-excitation fluorescence spectra were measured using a Varian Cary Eclipse Spectrometer, over an excitation wavelength range from 200 nm to 600 nm with intervals of 5 nm, and emission wavelength range also from 200 nm to 600 nm, but with intervals of 2 nm, giving a total of 81 excitation and 201 emission wavelengths. Data was collected using the software Cary Eclipse Bio, Package 1.1.

Spectral Treatment and Chemometrics Analysis:

Spectra pre-processing and chemometrics calculations were performed in Matlab® 7.2 (MathWorks, U.S.A.) using PLS toolbox 5.5 (Eigenvector, U.S.A.) and Simca P+ 12.01 (Umetrics, Sweden). Rayleigh and Raman scatterings were removed using the EEMscat algorithm (Bahram et al, 2006).

Multivariate data analysis was performed using PCA (Principal Component Analysis) and PLS (Partial Least Squares). These techniques are based on the reduction of dimensionality present in the data, allowing the retrieval of relevant information hidden in the massive amount of data. It is made transforming the original measured variables into new variables called principal components. The PCA analysis was used to find patterns in the spectra. With the aim to relate these patterns with a particular parameter, PLS analysis was carried out to build a mathematical model able to predict the values of this parameter in future samples using only the spectral information.

In order to build reliable models, the quality of analytical measurements has fundamental importance. Since noise and unwanted information are intrinsic to the measurements, it is necessary to pre-treat the obtained spectra.

One of the most common techniques to deal with these problems in the NIR spectra is the Savitzky-Golay smoothing filter (Savitzky, A. and Golay, M. J. E., Anal. Chem., 36 (1964) 1627-1639), and it is commonly used in conjunction with derivatives, which has the advantage of reduce baseline shifts and enhance the significant properties of the spectrum.

For fluorescence spectra, the major problems are related to the Raman and Rayleigh scattering, which are caused by deviations of the light that are not related to the fluorescence properties of the sample. Since the wavelength regions affected by scattering are known, the intensities measured in such particular regions can be removed replacing it by interpolated points.

The three-way emission-excitation spectra were unfolded with the purpose of have a matrix suitable to the PLS and PCA analysis. A Parafac based three way analysis was also done for calibration purposes. (Bahram, M., et al., J. Chemometrics, 20 (2006) 99-105). The unfolding approach consists in concatenating two of these three dimensions, keeping the other fixed. In this case, the emission and excitation axis were concatenated, maintaining the information of the samples.

What is claimed is:

1. A method for selecting testing lots of cultivation components to be used in the cultivation of a mammalian cell expressing a protein of interest wherein at least two different components are employed in the cultivation, the method comprising the following steps:
  (a) measuring spectra of different lots of a first component, wherein the spectra are measured by a first spectrometer using near-infrared (NIR) or mid-infrared (MIR) spectroscopy;
  (b) measuring spectra of different lots of a second component, wherein the spectra are measured by a second spectrometer using 2D-fluorescence spectroscopy;
  (c) processing the measured spectra data by chemometrics to generate fused and compressed spectral patterns;
  (d) cultivating the mammalian cell expressing the protein of interest for a period of time, using combinations of the different lots of the first and second components;
  (e) measuring a supernatant yield of the protein of interest isolated from the cultivation in step (d) and compiling a calibration dataset comprising the lots' information and corresponding yields for different lots of the first and second components;
  (f) establishing a mathematical model correlating the spectral patterns from step (c) with the calibration dataset from step (e) for the first and second components;
  (g) measuring and processing the spectrum of a testing lot of the first component, wherein the spectrum is measured and processed according to steps (a) and (c);
  (h) measuring and processing the spectrum of a testing lot of the second component, wherein the spectrum is measured and processed according to steps (b) and (c);
  (i) predicting cultivation supernatant yield for the testing lot of the first component and the testing lot of the second component by applying the spectral data from steps (g) and (h) to the mathematical model from step (f); and
  (j) selecting a combination of the tested lots of the first and second components for use in the cultivation of the mammalian cell expressing the protein of interest if the predicted cultivation supernatant yield from step (i) is within +/−10% of the mean yield of the protein of interest measured in step (e),
  wherein the chemometrics used in step (c) is principal component analysis (PCA).

2. The method according to claim 1, wherein the spectral patterns are represented by PCA scores.

3. The method according to claim 1, wherein the mathematical model in step (f) is established using partial least square analysis (PLS).

4. The method according to claim 1, wherein the protein of interest is an antibody, an antibody fragment or an antibody conjugate.

5. The method according to claim 1, wherein the first component is a raw material.

6. The method according to claim 5, wherein the raw material is soy protein hydrolysate or rice protein hydrolysate.

7. The method according to claim 1, wherein the second component is a chemically defined basic medium.

* * * * *